United States Patent [19]

Menand et al.

[11] 4,058,509

[45] Nov. 15, 1977

[54] PROCESS FOR THE COPOLYMERIZATION OF ACRYLONITRILE AND SULPHONATE MONOMERS

[75] Inventors: Henri Menand, Saint-Fons; André Mison, Lyon, both of France

[73] Assignee: Rhone-Poulenc S.A., Paris, France

[21] Appl. No.: 568,448

[22] Filed: Apr. 16, 1975

Related U.S. Application Data

[63] Continuation-in-part of Ser. No. 110,758, Jan. 28, 1971, abandoned.

[30] Foreign Application Priority Data

Jan. 30, 1970 France .............................. 70.03350

[51] Int. Cl.$^2$ ...................... C08F 28/00; C08G 75/24
[52] U.S. Cl. .......................... 260/79.7; 260/29.6 SQ; 260/29.6 AN; 260/29.6 AB; 260/29.6 M; 260/79.3 MU; 526/236; 526/342
[58] Field of Search ...... 260/79.7, 79.3 MU, 29.6 SQ, 260/29.6 AN, 29.6 Q, 29.6 AB, 29.6 M; 526/236, 238, 342

[56] References Cited

U.S. PATENT DOCUMENTS

| | | | |
|---|---|---|---|
| 2,560,694 | 7/1951 | Howard | 526/238 |
| 2,648,646 | 8/1953 | Stanton et al. | 260/29.6 AB |
| 2,648,647 | 8/1953 | Stanton et al. | 260/29.6 AB |
| 3,214,419 | 10/1965 | Hodgdon | 526/236 |
| 3,397,262 | 8/1968 | Stoy et al. | 260/29.6 AB |
| 3,483,172 | 12/1969 | Shibukawa et al. | 260/29.6 AN |
| 3,505,290 | 4/1970 | Mazzolini et al. | 260/79.3 MU |
| 3,657,408 | 4/1972 | Chinai et al. | 260/29.6 AN |
| 3,730,872 | 5/1973 | Marze | 260/2.2 R |

*Primary Examiner*—Ronald W. Griffin
*Attorney, Agent, or Firm*—Stevens, Davis, Miller & Mosher

[57] ABSTRACT

Acrylonitrile-unsaturated sulphonate copolymers are prepared with an increased sulphonate content relative to the sulphonate content in the monomer mixture, in an aqueous heterogeneous phase, by using an aqueous medium of an inorganic halide or nitrate of ammonia or of a metal of group IA or IIA of the Periodic Table.

11 Claims, No Drawings

PROCESS FOR THE COPOLYMERIZATION OF ACRYLONITRILE AND SULPHONATE MONOMERS

This is a continuation-in-part of Ser. No. 110,758, filed Jan. 28, 1971, now abandoned.

This invention relates to a process for the preparation of copolymers of acrylonitrile with polymerisable sulphonic acids or their salts.

It has already been proposed to copolymerise acrylonitrile with sulphonate derivatives, particularly in the production of fibres.

Copolymers containing 5% by weight or more of sulphonate monomer units are used in various fields other than the fibre field on account of their ionic character.

Thus U.S. Pat. No. 3,730,872 describes membranes suitable for the electrolysis of sea-water obtained from a copolymer of acrylonitrile and sodium methallylsulphonate containing 15% by weight of the sulphonate. French Pat. No. 2,199,014 discloses hollow fibres suitable for use in electrodialysis and ultrafiltration made from copolymers of acrylonitrile containing 5 to 15% by weight or more of sulphonate monomer. Such fibres can be used, in particular, in the medical field in the construction of artificial kidneys. Other applications in the field of polyelectrolytes (see French Pat. No. 2,144,922) and in the field of semi-permeable membranes (see French Pat. No. 2,105,502) have been provided by acrylonitrile polymers containing relatively large amounts of sulphonate.

However, unsaturated sulphonate monomers, and in particular aliphatic ones, have a fairly low copolymerisation capacity. As a result, in order to obtain a specific proportion of sulphonate groups in an acrylonitrile polymer, it is necessary to employ an amount of sulphonate monomer for the copolymerisation which is much greater than that actually incorporated in the copolymer [see, for example, BRESLOW, Journal of Polymer Science 27, 299–300 (1958), U.S. Pat. No. 2,601,256 and French Pat. No. 1,213,143].

In U.S. Pat. No. 3,505,290 there is described in process for the polymerisation of acrylonitrile with a sulphonic or carboxylic monomer in the presence of a very small amount of an alkaline sulphate relative to the reaction mixture. By this process polymers are obtained which can be made into fibres having improved whiteness and certain other improved mechanical properties. But the dyeing affinity of these fibres remains practically unchanged and one therefore concludes that the sulphonate content in the polymer remains practically unchanged also.

Amongst copolymerisable sulphonate monomers, the allylsulphonate and methallylsulphonate derivatives are the most valuable, because they are readily available commercially, but their copolymerisation capacity with acrylonitrile is limited and they can only be copolymerised if they are present above a certain proportion in the monomer mixture. Thus, if acrylonitrile is polymerised in the presence of 2 to 3% of these derivatives, a polymer having a negligible sulphonate content is obtained (see French Pat. No. 1,333,067).

The present invention relates to a process whereby the production of acrylonitrile-unsaturated sulphonate copolymers containing 5% by weight or more of sulphonate monomer units is improved. According to the present invention, there is provided a process for copolymerising acrylonitrile with an unsaturated sulphonate monomer and, optionally, a further monomer, the copolymer containing at least 5% by weight of sulphonate units which comprises polymerising the monomers in an aqueous medium containing 5 to 30% by weight of an inorganic salt selected from halides and nitrates of ammonia or of a metal of group IA or IIA of the Periodic Table (Handbook of Chemistry & Physics, 45th edition, B-2).

Acrylonitrile can thus be copolymerised with an unsaturated sulphonic acid or an alkali metal salt thereof, for example vinylsulphonate derivatives, allylsulphonate derivatives, methallylsulphonate derivatives, allyloxyethanesulphonate derivatives, styrenesulphonate derivatives and their homologues, vinyloxybenzenesulphonate derivatives, allyloxybenzenesulphonate derivatives and methallyloxybenzenesulphonate derivatives. The proportion of sulphonate monomers in the monomer mixture to be polymerised can extend over a wide range, for example from 5 to 40% depending on the desired ionic capacity. A third monomer can also be copolymerised; thus, for example, vinyl esters such as vinylacetate, acrylic and methacrylic esters, vinyl chloride and vinylidene chloride, can be incorporated.

The polymerisation is carried out in an aqueous solution of an inorganic salt which is a halide or a nitrate. Sodium chloride, potassium chloride, magnesium chloride, calcium chloride, ammonium chloride and ammonium nitrate give very good results; sodium chloride is preferred. The weight concentration of these salts in water is between 5 and 30%. A large amount of salt is not objectionable, since it is easy to remove this salt by washing the resulting copolymer with water.

The conditions of pH, temperature, and concentration under which the polymerisation is conducted, as well as the various initiators which may be used, are those generally employed to carry out aqueous heterogeneous phase polymerisations. Such processes are described, for example, in HOUBEN-WEYL, Methoden der organischen Chemie 14/1, p. 133 et seq.

The following Examples further illustrate the present invention. Example 21 is included as a comparative Example to illustrate the inferior results obtained by using a sulphate instead of a nitrate or halide.

EXAMPLE 1

An aqueous solution of sodium chloride, obtained by dissolving 600 g of sodium chloride in 1950 cm$^3$ of water, was introduced, under a nitrogen atmosphere, into a three-necked, 3 litre flask provided with a stirrer having movable blades which scrape the walls of the flask, a thermometer, a nitrogen inlet and, at the top, a reflux condenser. The mixture was stirred and 126 g of acrylonitrile stabilised with 50 p.p.m. of ammonia, 15 g of sodium methallylsulphonate of 93.3% purity (corresponding to 14 g of pure product, representing 10% by weight of the mixture of the monomers), 10 cm$^3$ of a 0.0490% by weight aqueous solution of MOHR's salt (ferrous ammonium sulphate) and 4 cm$^3$ of a normal aqueous solution of sulphuric acid, in order to lower the pH value to 2.5, were added; the temperature was 24.5° C. The temperature was raised to 30° C, and 5 cm$^3$ of a 34.45% aqueous solution of sodium bisulphite, and 0.491 g of potassium chlorate dissolved in 40 cm$^3$ of water, were added. The temperature of the reaction mass progressively rose to 43.7° C. After 4½ hours, the reaction mass was filtered on a BUCHNER filter, the polymer was washed on the filter with boiling, softened water, until no chloride ions remained in the wash waters. The suction-dried polymer was ground and put in an oven at 70° C, under a vacuum of 15 mm Hg. to dry. 122 g of polymer were thus obtained, representing a yield of 87.1% based on the weight of the monomers. The proportion of sulphonic acid contained in the polymer was measured. For this purpose, the polymer was dissolved in some propylene carbonate; the solution was then passed over an ion exchange resin to liberate the acid groups present in the polymer, and the acidity was determined using a N/100 aqueous solution of sodium hydroxide. The acidity of a polymer prepared under the same conditions but in the absence of sulphonate monomer was determined in the same way; the proportion of acidity which can be attributed to the sulphonate monomer was calculated by difference, and from the latter proportion the percentage of the sulphonate monomer present in the polymer was determined. The results of this experiment were collected in Table 1 below, as well as the results of comparative experiments carried out with or without sulphonate monomer, and in the absence of sodium chloride.

They show clearly that the presence of sodium chloride simultaneously considerably improves the total degree of conversion of the monomers, the degree of conversion of the sulphonate monomer, and the content of sulphonate monomer in the polymer.

TABLE 1

| Proportion of sodium methallylsulphonate | 10 | 0 | 10 | 0 |
|---|---|---|---|---|
| Proportion of sodium chloride | 300 | 300 | 0 | 0 |
| Total conversion | 87.1 | 95.7 | 55.7 | 80.7 |
| Acidity | 576 | 36 | 322 | 26 |
| Sulphonate in the polymer | 8.50 | — | 4.65 | — |
| Polymerised sulphonate | 74.4 | — | 26.0 | — |
| Viscosity | 0.866 | 0.629 | 0.430 | 0.376 |

The quantities which appear in the first column of this Table and in the Tables which follow, are defined as follows:

The proportion of sulphonate monomer (in this case sodium methallylsulphonate) is expressed as the weight of sulphonate monomer in the mixture of the monomers before polymerisation.

The proportion of inorganic salt (in this case sodium chloride) is expressed in grams per liter of water.

The total conversion is expressed as the number of grams of polymer obtained per 100 g of the mixture of the monomers.

The acidity is expressed in milliequivalents of acid per kg of polymer.

Sulphonate in the polymer = weight of sulphonate monomer in 100 g of polymer.

Polymerised sulphonate = % of sulphonate monomer which has copolymerised.

Viscosity = specific viscosity of the polymer, measured at 20° C, in a solution containing 2 g of polymer per liter of dimethylformamide.

EXAMPLES 2 to 6

These examples, carried out as in Example 1 (aqueous solution containing 300 g of sodium chloride per liter), illustrate the copolymerisation of mixtures of acrylonitrile and sodium methallylsulphonate, in which the percentage of sulphonate derivative varies from 2 to 30%.

The results are assembled in Table 2. These results show that the improvements noted in Example 1 are also found where the proportion of sulphonate monomer is as low as 2% or as high as 30%. The presence of sodium chloride in the polymerisation medium allows acrylonitrile polymers having a low content of sulphonate groups to be prepared, and to do so with an almost complete conversion of the sulphonate monomer. It also allows copolymers containing up to 20% of sulphonate monomer to be produced, which is impossible to achieve in the absence of sodium chloride.

TABLE 2

| Example Nos. | 2 | 3 | 4 | 5 | 6 |
|---|---|---|---|---|---|
| Proportion of sodium methallylsulphonate | 2 | 5.07 | 15.2 | 20 | 30 |
| Total conversion | 93.6 | 93.5 | 80.7 | 66.4 | 48.6 |
| Acidity | 163 | 372 | 840 | 930 | 1308 |
| Sulphonate in the polymer | 2 | 5.3 | 12.7 | 14.15 | 20.15 |
| Polymerised sulphonate | 93.6 | 97.6 | 67.5 | 47 | 32.6 |
| Viscosity | 0.695 | 0.817 | 0.790 | 0.816 | 0.687 |

The calculation of the acidity of the polymer and the determination of the proportion of sodium methallylsulphonate were carried out taking into account the acidity due to the catalyst (36 milliequivalents/kg) indicated by the comparative experiment of Example 1, in which acrylonitrile by itself was polymerised, in the absence of sulphonate monomer.

EXAMPLES 7 to 9

The conditions of Example 1 were adopted, but sodium methallylsulphonate was replaced stoichiometrically by another sulphonate monomer as follows:

Example 7 — potassium vinyloxybenzenesulphonate — 21.1 g
Example 8 — sodium allylsulphonate — 12.75 g
Example 9 — sodium vinylsulphonate — 11.5 g The results of these experiments are assembled in Table 3, as well as those of comparative experiments carried out in a similar manner but without sodium chloride in the polymerisation medium.

TABLE 3

| Example Nos. | 7 | | 8 | | 9 | |
|---|---|---|---|---|---|---|
| Proportion of sodium chloride | 300 | 0 | 300 | 0 | 300 | 0 |
| Total conversion | 95.9 | 65.3 | 84.3 | 72 | 84.4 | 72.7 |
| Acidity | 633 | 373 | 234 | 111 | 165 | 89 |
| Sulphonate in the polymer | 14.2 | 8.25 | 2.86 | 1.22 | 1.68 | 0.82 |
| Polymerised sulphonate | 95.5 | 37.6 | 26.4 | 9.6 | 17 | 7.1 |
| Viscosity | 2.933 | 0.589 | 0.685 | 0.447 | 0.699 | 0.485 |

These examples show that with any sulphonate monomer, the copolymerisation occurs better in saline water than in pure water, and that the presence of sodium chloride produces a significant improvement even with monomers such as sodium allylsulphonate and sodium vinylsulphonate, where the capacity for copolymerisation is slight.

EXAMPLES 10 and 11

Monomer mixtures consisting of: Example 10: Acrylonitrile/methyl methacrylate/sodium methallylsulphonate 85/5/10 (by weight) Example 11: Acrylonitrile/vinylidene chloride/sodium methallylsulphonate 80/10/10 were polymerised under the conditions of Example 1.

The results was assembled in Table 4, together with those from comparative experiments carried out in the absence of sodium chloride.

TABLE 4

| Example Nos. | 10 | | 11 | |
|---|---|---|---|---|
| Proportion of sodium chloride | 300 | 0 | 300 | 0 |
| Total conversion | 80 | 61.4 | 82.1 | 53.6 |
| Acidity | 517 | 220 | 606 | 280 |
| Sulphonate in the polymer | 7.60 | 3.05 | 9 | 4.01 |
| Polymerised sulphonate | 61 | 18.8 | 74 | 21.5 |
| Viscosity | 1.192 | 0.410 | 0.621 | 0.374 |

EXAMPLE 12

An experiment identical to that in Example 1 was carried out, using a potassium persulphate (0.790 g)/potassium bisulphite (2.765 g) catalyst system. The results of this experiment and of comparative experiments carried out in pure water or in saline water, in the presence or in the absence of sodium methallylsulphonate, are assembled in Table 5.

TABLE 5

| Proportion of sodium methallylsulphonate | 10 | 0 | 10 | 0 |
|---|---|---|---|---|
| Proportion of sodium chloride | 300 | 300 | 0 | 0 |
| Total conversion | 85.7 | 96.4 | 68.6 | 89.3 |
| Acidity | 580 | 57 | 309 | 57 |
| Sulphonate in the polymer | 8.25 | — | 3.98 | — |
| Polymerised sulphonate | 71 | — | 27.3 | — |
| Viscosity | 0.552 | 0.483 | 0.462 | 0.325 |

EXAMPLES 13 to 16

An acrylonitrile/sodium methallylsulphonate mixture, in a weight ratio of 90/10, was polymerised under the conditions of Example 1 in aqueous solutions of sodium chloride of different concentrations. The polymerisation was stopped after 3½ hours. The results obtained are shown in Table 6.

TABLE 6

| Example Nos. | 13 | 14 | 15 | 16 |
|---|---|---|---|---|
| Proportion of sodium chloride | 0 | 100 | 200 | 300 | 360 |
| Total conversion | 55.7 | 59.3 | 73.6 | 85 | 86.4 |
| Acidity | 295.5 | 480 | 530 | 590 | 606 |
| Sulphonate in the polymer | 4.27 | 7 | 7.85 | 8.75 | 9 |
| Polymerised sulphonate | 23.7 | 41.5 | 57.8 | 74.4 | 77.6 |
| Viscosity | 0.433 | 0.549 | 0.722 | 0.883 | 0.791 |

EXAMPLES 17 to 22

Example 1 was repeated, replacing 300 g of sodium chloride by the same amount of another inorganic salt. The results obtained are given in Table 7.

TABLE 7

| Example Nos. | 17 | 18 | 19 | 20 | 21 | 22 |
|---|---|---|---|---|---|---|
| Inorganic salt | KCl | NH$_4$Cl | CaCl$_2$ | MgCl$_2$ | Na$_2$SO$_4$ | NaNO$_3$ |
| Total conversion | 80 | 77.1 | 80.7 | 69.3 | 74.3 | 70 |
| Acidity | 548 | 550 | 598 | 572 | 440 | 562 |
| Sulphonate in the polymer | 8.1 | 8.15 | 8.9 | 8.47 | 6.4 | 8.31 |
| Polymerised sulphonate | 64.8 | 62.9 | 71.8 | 58.7 | 47.5 | 58.2 |
| Viscosity | 0.634 | 0.507 | 0.438 | 0.518 | 2.393 | 0.439 |

We claim:

1. A process for the preparation of acrylonitrile unsaturated sulphonate copolymers containing at least 5% by weight of sulphonate units, which comprises polymerising a mixture of monomers consisting of (i) acrylonitrile and (ii) unsaturated sulphonate in an aqueous medium containing 5 to 30% by weight of an inorganic salt selected from halides and nitrates of ammonia or of a metal of Group IA or IIA of the Periodic Table (Handbook of Chemistry and Physics, 45th Edition, B-2).

2. A process according to claim 1 wherein the inorganic salt is sodium, potassium, magnesium or calcium chloride or ammonium nitrate.

3. A process according to claim 1 wherein the sulphonate monomer is a sulphonic acid or an alkali metal salt thereof.

4. A process according to claim 1 wherein the sulphonate monomer is vinylsulphonic acid, allylsulphonic acid, methallylsulphonic acid, allyloxyethanesulphonic acid, styrene-sulphonic acid, vinyloxybenzenesulphonic acid, allyloxybenzenesulphonic acid, or methallyloxybenzenesulphonic acid or an alkali metal salt of a said acid.

5. A process according to claim 1 wherein the sulphonate monomer is sodium methallylsulphonate.

6. A process for the preparation of acrylonitrile-unsaturated sulphonate copolymers containing at least 5% by weight of sulphonate units, which comprises polymerising a mixture of monomers consisting of (i) acrylonitrile, (ii) unsaturated sulphonate and (iii) vinyl esters, acrylic and methacrylic esters, vinylchloride or vinylidene chloride, in an aqueous medium containing 5 to 30% by weight of an inorganic salt selected from halides and nitrates of ammonia or of a metal of group IA or IIA of the Periodic Table (Handbook of Chemistry & Physics, 45th Edition, B-2).

7. A process according to claim 6 wherein the inorganic salt is sodium, potassium, magnesium or calcium chloride or ammonium nitrate.

8. A process according to claim 6 wherein the sulphonate monomer is a sulphonic acid or an alkali metal salt thereof.

9. A process according to claim 6 wherein the sulphonate monomer is vinylsulphonic acid, allylsulphonic acid, methallylsulphonic acid, allyloxyethanesulphonic acid, styrenesulphonic acid, vinyloxybenzenesulphonic acid, allyloxybenzenesulphonic acid or methallyloxybenzenesulphonic acid, or an alkali metal salt of a said acid.

10. A process according to claim 6 wherein the sulphonate monomer is sodium methallylsulphonate.

11. A process for the preparation of acrylonitrile-unsaturated sulphonate copolymers containing at least 5% by weight of sulphonate units, which comprises polymerising a mixture of monomers consisting of (i) acrylonitrile, (ii) unsaturated sulphonate and (iii) vinyl acetate, methyl methacrylate, vinyl chloride or vinylidene chloride in an aqueous medium containing 5 to 30% by weight of an inorganic salt selected from halides and nitrates of ammonia or of a metal of group IA or IIA of the Periodic Table (Handbook of Chemistry and Physics, 45th Edition, B-2).

* * * * *